Feb. 6, 1940.  F. C. REGGIO  2,189,252
BLOWER
Filed May 7, 1938  3 Sheets-Sheet 1
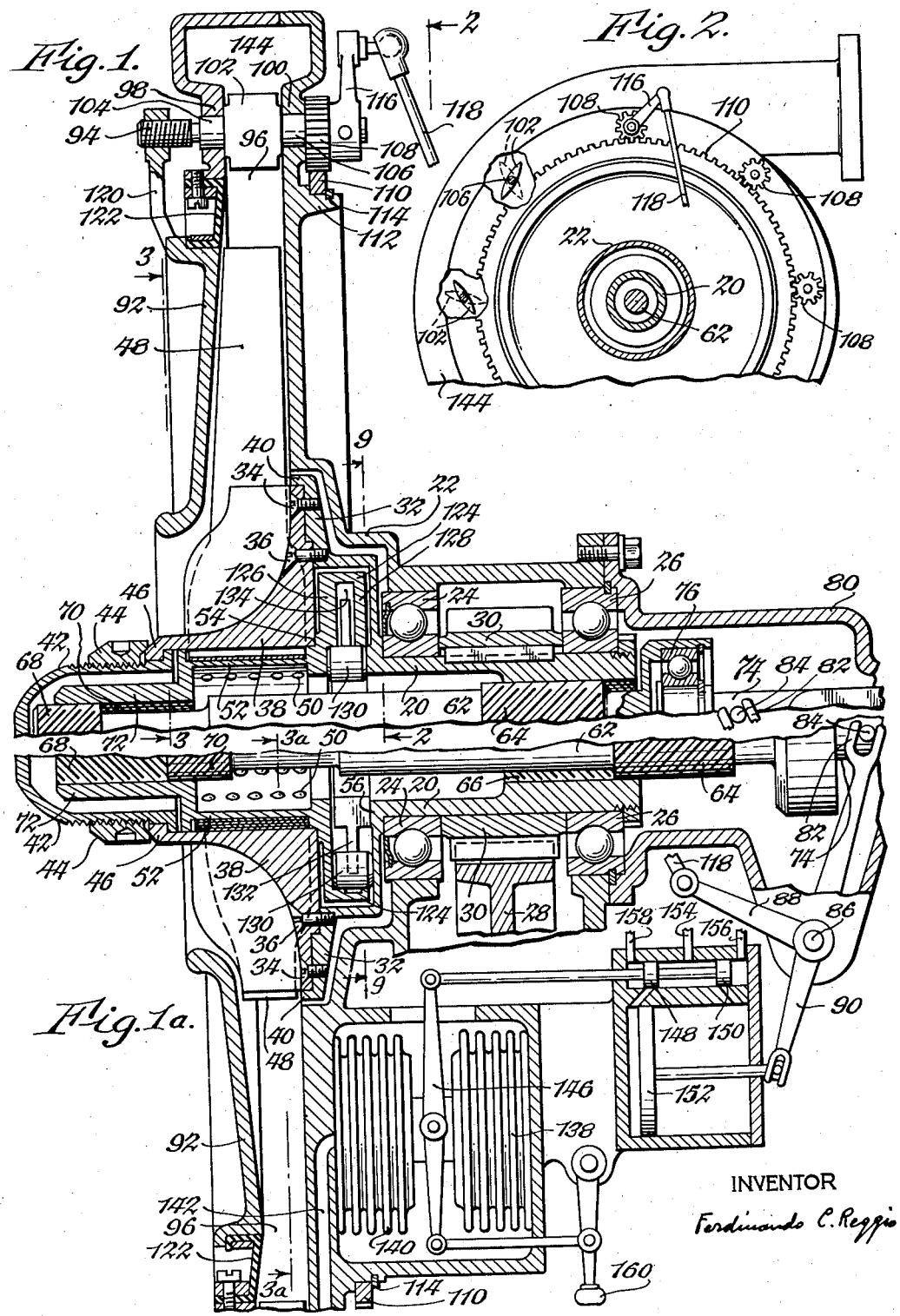
INVENTOR
Ferdinando C. Reggio

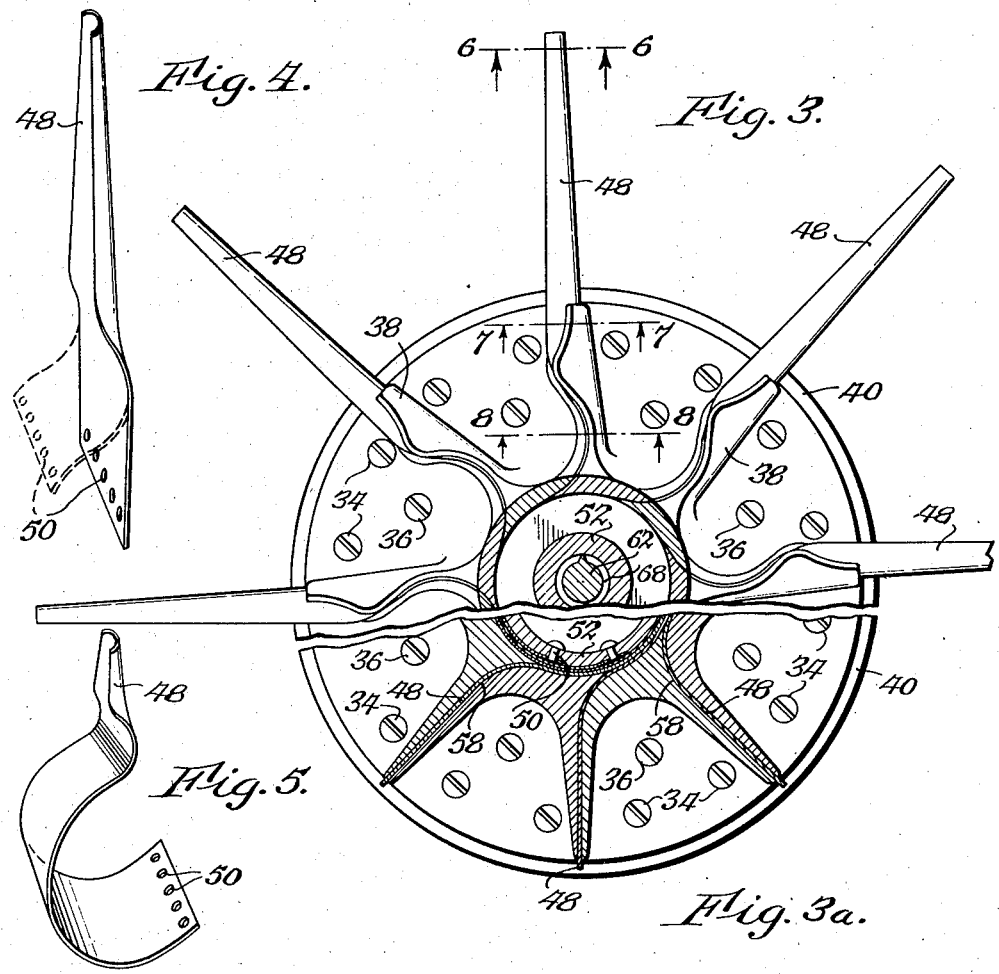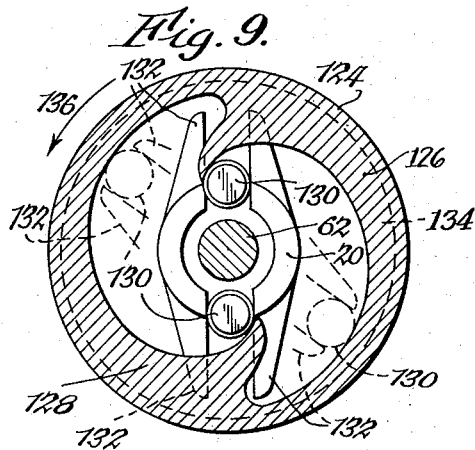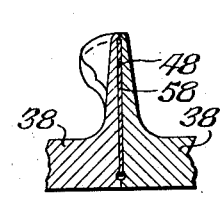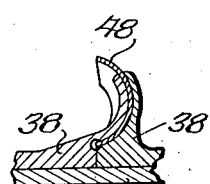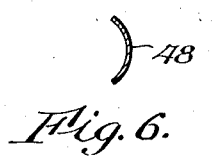

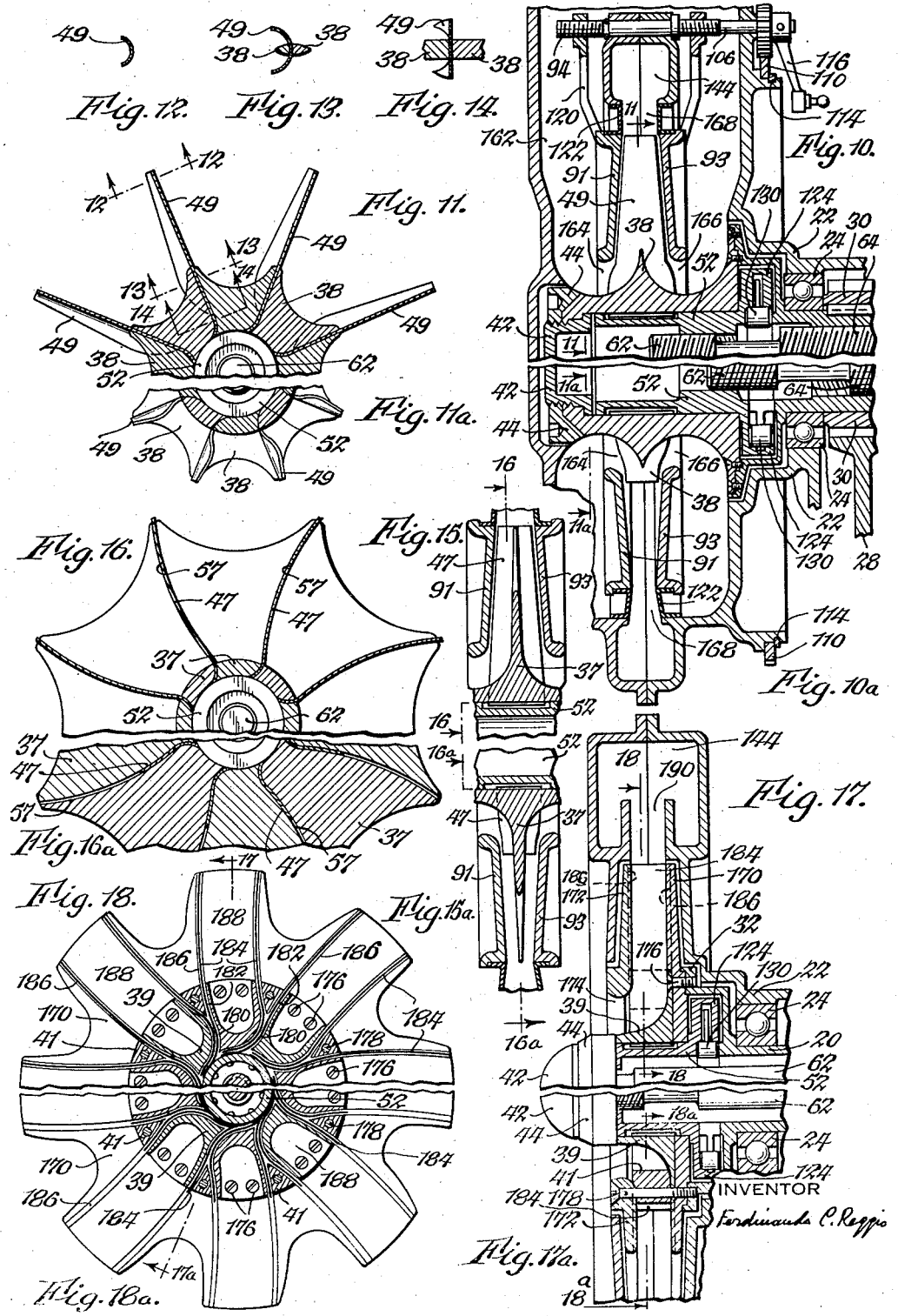

Patented Feb. 6, 1940

2,189,252

UNITED STATES PATENT OFFICE 2,189,252

BLOWER

Ferdinando Carlo Reggio, Buffalo, N. Y.

Application May 7, 1938, Serial No. 206,603

9 Claims. (Cl. 230—114)

This invention relates to centrifugal blowers and more particularly to the type used as superchargers or scavenging blowers for internal combustion engines, and in so far as the subject matter is common, is a continuation in part of my application filed June 7, 1937, Serial No. 147,715.

The principal object of the present invention resides in the provision of a centrifugal blower or supercharger whose delivery characteristic can be varied independently of its rotational speed.

A further object of the invention resides in the provision of a centrifugal blower including an impeller of adjustable outer diameter and means for controlling said diameter, thus varying the capacity of the blower.

With the above and other objects in view, which will appear as the description proceeds, my invention consists in the novel details of construction and arrangement of parts described in the following specification and illustrated in the accompanying drawings; and while I have illustrated and described the preferred embodiments of the invention, as they now appear to me, it will be understood that such changes may be made as fall within the scope of the appended claims. In the following description and in the claims various details will be identified by specific names for convenience, but they are intended to be as generic in the application as the art will permit.

In the drawings:

Fig. 1 is a fragmental longitudinal section through one of the preferred forms of the invention showing the adjustment of the blower corresponding to maximum capacity; Fig. 1a is another fragmental longitudinal section as in Fig. 1 but showing the adjustment corresponding to minimum capacity; Fig. 2 is a section on the line 2—2 of Fig. 1; Fig. 3 is a fragmental section on the line 3—3 of Fig. 1 with certain parts removed to show the impeller; Fig. 3a is a fragmental section on the line 3a—3a of Fig. 1a; Figs. 4 and 5 are perspective views of one of the impeller blades in two different adjustments; Figs. 6, 7 and 8 are sections on the lines 6—6, 7—7 and 8—8 respectively of Fig. 3; Fig. 9 is a section on the line 9—9 of Fig. 1; Fig. 10 is a fragmental longitudinal section through a modified form of the invention showing the adjustment of the impeller corresponding to maximum capacity; Fig. 10a is another fragmental longitudinal section as in Fig. 10 but showing the adjustment for minimum capacity; Fig. 11 is a section on the line 11—11 of Fig. 10 with certain parts removed to show the impeller; Fig. 11a is a section on the line 11a—11a of Fig. 10a; Figs. 12, 13 and 14 are sections on the lines 12—12, 13—13 and 14—14 respectively of Fig. 11; Fig. 15 is a fragmental longitudinal section through another modified form of the invention showing the adjustment of the impeller corresponding to maximum capacity; Fig. 15a is another fragmental longitudinal section as in Fig. 15 but showing the adjustment for minimum capacity; Fig. 16 is a section on the line 16—16 of Fig. 15 with certain parts removed to show the impeller; Fig. 16a is a section on the line 16a—16a of Fig. 15a; Fig. 17 is a fragmental longitudinal section through a third modified form of the invention, showing the adjustment of the impeller corresponding to maximum capacity; Fig. 17a is another fragmental longitudinal section as in Fig. 17, but showing the adjustment for minimum capacity; Fig. 18 is a section on the line 18—18 of Fig. 17; and Fig. 18a is a section on the line 18a—18a of Fig. 17a.

In one of the preferred forms of the invention an impeller shaft 20, carried in a housing 22 by a pair of ball bearings 24, 26, is driven from an engine, not shown in the drawings, by means of a gear 28 and a pinion 30 keyed on the shaft 20 for this purpose.

One end of the shaft 20 is provided with a flange 32 to which are attached by means of screws 34, 36, several elements 38 forming the rigid part of the impeller. At the outer periphery of the flange 32 an annular rim 40 centers the rear ends of the elements 38 and holds them against the action of the centrifugal force. A screw 44, tightened on an end piece 42, holds the rims 46 formed at the front end of the elements 38, and serves to reenforce the impeller.

The elements 38 do not extend to the axis, but leave a hollow cylinder in the center of the impeller. Between each pair of adjacent elements 38 a clearance space 58, shown in Fig. 3a, is provided, extending from the inner cylindrical cavity to the outer diameter of the impeller. Slidably mounted in each of said clearance spaces 58 there is a flexible blade 48 made, entirely or in part, of resilient material such as thin metal sheet.

The inner ends of the blades 48 are tangentially secured by means of rivets 50 to a drum 52 rotatably mounted in the central cavity of the impeller, said drum being prevented from axial displacement by abutments 54 and 56 formed in the impeller 38 and in the impeller shaft 20. As shown in Figs. 3 and 3a, after leaving tangentially the surface of drum 52, the blades 48, guided in the clearance spaces 58, are curved so as to assume, from the section line 8—8 outwardly, a substantially radial direction. Beyond said line 8—8, the blades 48 are curved laterally so as to assume, at the outer end of the clearance spaces 58, the section shown in Fig. 7. Beyond the outer diameter of elements 38, the blades extend, laterally curved, up to their outer end, whose section is shown in Fig. 6.

A perspective view of a free blade 48 is shown in Fig. 4 by the unbroken line. In dotted line is shown the deflection of the same blade when assembled in the impeller, said impeller being adjusted for maximum capacity, or maximum outer diameter.

When the drum is rotated in the proper direction relatively to the impeller shaft 20, the blades, owing to their flexibility, are caused to slide simultaneously in the clearance spaces 58 and are wound round the drum 52, whereby the outer diameter of the impeller is reduced. Obviously, rotation of the drum in the opposite direction causes the outer diameter of the impeller to be increased. Fig. 5 shows the form assumed by the blade of Fig. 4 as the impeller is adjusted for minimum capacity.

The blades 48 are laterally curved to lessen the impact of the air on the blades as it enters, and to increase the rigidity of that portion of the blade that extends unsupported beyond the clearance space 58. While the impeller is rotating, the centrifugal force increases the stiffness of the blades and eliminates any danger of bending. In fact, the inertia force capable of acting perpendicularly on the blades 48 as the impeller rotational velocity is being changed is very low owing to the extreme lightness of the blades; and the load exerted on the blades by the impact of the air and by the unequal distribution of the air pressure is negligible in comparison with the centrifugal force at the high rotational speed of modern centrifugal blowers. Furthermore, thin sheet material such as laminated steel, possesses such high mechanical properties that the peripheral speed of the impeller, when adjusted for maximum diameter, can be far in excess of the peripheral speed attainable with conventional light alloy solid impellers.

Both the impeller shaft 20 and the central member or drum 52 are hollow and contain a control rod 62 provided at one end with helical splines 64 which fit corresponding splines 66 on the inside of the impeller shaft 20, and at the opposite end with helical splines 68 which fit helical splines 70 on the inside of an extension 72 of the drum 52. The pitches of the helical splines 64 and 68 being different, an axial displacement of the control rod 62 causes relative rotation of the impeller and of the drum 52, which in turn causes the outer diameter of the impeller to be changed.

In the blower shown in Fig. 1 the impeller, which receives air at its central portion, discharges it at its periphery to a diffuser provided with vanes 102 in which velocity of the air is converted into pressure. A diffuser designed for use with an impeller of given diameter at given rotational speed is not equally efficient with an impeller of another diameter.

In Fig. 1 the space 96 forming the diffuser lies between two parallel walls 98 and 100 of the casing. A plurality of vanes 102 are placed in the diffuser, each vane 102 being formed integrally with two short shafts 104 and 106 and rotatably mounted in the casing members 98 and 100. Fixed on each shaft 106 there is a pinion 108 whose teeth engage the teeth of an annular gear 110 rotatably carried by a circular rim 112 of the casing 22 and maintained in place by a snap ring 114. A lever 116, fixed to one of the shafts 106, is connected by means of a rod 118 with a lever 88 fixed to the shaft 86 and rotates with the lever 90 for varying the diameter of the impeller.

It will be noted that if the blades 48 are tapered as shown in some of the drawings, the thickness of the impeller at any given radius will change as the blades 48 are moved in and out and the diameter of the rotor varied. To compensate for the change in thickness, one side or wall 92 of the impeller casing is arranged to move in and out as the impeller diameter is decreased or increased. This is accomplished by mounting the side 92 of the casing on the ends of three or more among the short shafts 94 which are provided with helical splines interengaging helical splines of the brackets 120 carried by the movable wall 92. So that changes in impeller diameter cause simultaneous change in the angle of all the vanes 102 of the diffuser and axial displacement of the wall 92 whereby the proper clearance is maintained between the impeller blades 48 and the wall 92. An annular flexible wall 122 joins the edge of the movable wall 92 to the fixed portion 98 of the casing, prevents leakage and allows relative displacement therebetween.

Centrifugal force acting on the blades 48 when the impeller is rotating results in torque applied to the drum 52 to which the blades 48 are tangentially secured, said torque tending to increase the diameter of the impeller. In order to balance said torque in all positions of the blades and at all speeds so that no reaction be transmitted to the control rod 62, the drum 52 carries a head 124 located in a cylindrical cavity comprised between the impeller 38 and the impeller shaft 20. The head 124 contains two non-circular peripheral walls 126 and 128 against the inner contour of which a pair of cylindrical weights 130 can roll, as shown in Fig. 9. Each of these weights can slide radially between the arms or jaws 132, located in a cylindrical cavity 134 comprised between the walls 126 and 128, said arms 132 being formed integrally with the impeller shaft 20. When the impeller is rotating the centrifugal force of the weights 130 tends to rotate the head 124, and the drum 52, in the direction of the arrow 136 of Fig. 9, thereby exerting on the drum 52 a torque tending to reduce the diameter of the impeller. If the walls 126 and 128 defining the path of the weights 130 are of the proper shape, the torques transmitted to the drum 52 by the centrifugal forces of the blades 48 and of the weights 130 will be in equilibrium.

It can be shown that the inner shape of the walls 126 and 128 must be such that the path of the center of the weights 130 in contact with them is given by the equation:

$$\rho = \sqrt{\rho_0^2 - \frac{2}{m}\int_0^\delta M d\delta}$$

where:

$\rho$ is the distance from the axis;

$\delta$ is the angular displacement in radians between the drum 52 and the impeller shaft 20, assuming $\delta=0$, for instance, when the impeller is adjusted to its minimum diameter;

$m$ is the total mass of the weights 130;

$M$, function of $\delta$, is the torque exerted on the drum 52 by the centrifugal force of the blades 48, assuming an impeller speed of one radian per sec.;

$\rho_0$ is the value assumed by $\rho$ for $\delta=0$.

The value of $M$ can easily be calculated for several values of $\delta$, and $$\int_0^\delta M d\delta$$

may always be obtained graphically.

In Fig. 9 the yoke 132 shown in unbroken line corresponds to the adjustment of the impeller giving maximum diameter, in which adjustment the blades 48 occupy the position shown in Figs. 1 and 3; and the yoke shown in dotted line corresponds to the adjustment shown in Figs. 1a and 3a.

It may be noted in Fig. 1 that the axially slidable control rod 62 is connected with both the impeller shaft 20 and the drum 52 by helical splines. By a suitable choice of the pitches of the two sets of helical splines it is possible to eliminate or balance out certain inertia effects. When the impeller is being accelerated or decelerated, there are inertia forces in the blades 48 having components transmitted to the drum 52, inertia forces in the drum 52 and in the head 124, and inertia forces in the control rod 62 and thrust bearing 76. All of these inertia forces form couples tending to rotate the drum 52 and the axially slidable control rod 62, and give rise to axial loads in the control rod 62.

These forces might interfere with maintaining or securing the proper adjustment, and impose additional load on the thrust bearing 76. It is therefore desirable to eliminate these inertia effects. This can be done by properly choosing the pitches of the two sets of helical splines 64 and 68 so that the above mentioned inertia forces and the forces transmitted by the splines balance out or neutralize. To secure this result, the ratio of the pitches of the two sets of splines should be:

$$\frac{P_1}{P_2} = \frac{I_1 + I_2}{I_2}$$

where:

$P_1$ is the pitch of the splines 64 fitting the splines 66 of the impeller shaft 20;

$P_2$ is the pitch of the splines 68 fitting the splines 70 of the drum 52;

$I_1$ is the moment of inertia of the axially slidable control rod 62 including the inertia of the parts nonrotatably connected therewith, such as the outer race of the bearing 76;

$I_2$ is the moment of inertia of the drum 52, of the head 124 plus that portion of the moment of inertia of the blades 48 which acts upon the drum 52.

With the ratio of the pitches fixed by the above equation, the pitches can still be chosen so as to give a suitable relation between axial displacement of the control rod 62 and rotation of the drum 52.

While the adjustment of the impeller diameter can be obtained by directly operating the control lever 90, an automatic device is shown in Fig. 1a, such as may be applied to a blower supplying compressed air to an airplane engine.

A pressure regulator is provided to operate the lever 90. This regulator includes a metallic bellows 138 sealed under vacuum and provided with a spring, not shown, adapted to expand said bellows. This bellows acts directly against a similar bellows 140 connected by means of a duct 142 with the collector 144. These two bellows act on a lever 146 to operate pistons 148 and 150 which control the admission of a compressed fluid to opposite sides of piston 152 which in turn operates the lever 90. The compressed fluid, usually oil from an engine-driven pump, is led into the pipe 154 and returns to the engine crankcase through conduits 156 and 158. The surrounding atmospheric pressure acts on the two bellows in opposite directions so that any change of pressure in the collector 144 operates the bellows 140 and in turn varies the diameter of the impeller and returns the pressure in collector 144 to the predetermined value, independently of any variation in atmospheric pressure such as that due to altitude.

A manual control 160, connected with the lower point of lever 146, is provided, whereby the value of the pressure automatically maintained in collector 144 may be adjusted. It is to be noted that, for a given position of the manual control 160, the absolute pressure in collector 144 will have a constant value independently of the changes, within the designed limits, of the surrounding atmospheric pressure.

A blower having a double-inlet impeller is shown in Figs. 10 to 14, wherein parts similar to those already described and shown in Figs. 1 to 8, and that it is considered unnecessary to again describe in detail, are indicated by similar numbers. The form of the blades 49 of the impeller having double inlet is similar to the form of the blades 48 already described; they are laterally curved to insure stiffness of their unsupported projecting end. Both sides of the blades being tapered, the impeller chamber is defined by two movable walls 91 and 93. Air enters the housing through a lateral opening 162, reaches the impeller through the two inlets 164 and 166 and is projected by the impeller into the diffuser 168, not including vanes, and in the collector 144.

Figs. 15 to 16a show an alternative construction of impeller having double inlet in which the impeller elements 37 extend outwardly to guide the blades 47 along their whole radial development, whereby said blades 47 do not require the same stiffness as the blades 49 of Figs. 11 to 14. Thus the blades 47 are not curved laterally. However, in order to avoid lateral flexibility of the blades 47, the clearance spaces 57 comprised between each adjacent pair of elements 37 are not straight, but slightly curved so as to maintain the blades 47 not flat but curved along a substantially cylindrical surface having the generatrix parallel to the axis of the impeller.

Figs. 17 to 18a show a shrouded type of impeller having a single inlet. It consists of two walls 170 and 172 perpendicular to the axis of the impeller and solidly connected to and rotating with the flange 32 of the impeller shaft 20. The wall 172 has a central opening, or inlet, through which air enters the impeller. Impeller elements 39 deflect the air as it enters, and together with elements 41 form distance pieces between walls 170 and 172. Walls 172 and 170 and elements 39 and 41 are rigidly assembled and secured to the flange 32 by means of screws 176 and 178. Between adjacent elements 39 there are clearance spaces 180 containing two flexible blades 184, and between adjacent elements 39 and 41 there are clearance spaces 182 containing one flexible blade 184. The inner surfaces of walls 170, 172 are provided with grooves 186 extending from the clearance spaces 182 to the outer diameter of the walls 170, 172. Sixteen flexible blades 184 tangentially secured to the drum 52 and adapted to slide in said clearance spaces 180 and 182, and in the grooves 186, define eight channels 188 of substantially uniform section extending from the impeller inlet. Radial length of said channels 188 and peripheral velocity at their outer end may be adjusted by means of relative rotation of the rigid part of the impeller and the drum 52. By the impeller air is projected into a diffuser 190 and into the collector 144. The impeller having a constant thickness, no movable wall is provided in the impeller housing.

These embodiments of the invention have been shown merely for purpose of illustration and not as a limitation of the scope of the invention. It is, therefore, to be expressly understood that the invention is not limited to the specific embodiments shown, but may be used in various other ways, in connection with other mechanisms and regulators, and various modifications may be made to suit different requirements, and that other changes, modifications, substitutions, additions and omissions may be made in the construction, arrangement and manner of operation of the parts within the limits or scope of the invention as defined in the following claims.

What I claim is:

1. A centrifugal blower including an impeller chamber, a rotatable impeller therein, a member coaxial with said impeller and capable of rotating relatively thereto, flexible blades slidably mounted in said impeller, said blades having their inner end tangentially secured to said member and their outer end projecting in a substantially radial direction, means for rotating said member relatively to said impeller whereby the relative position of said blades in said impeller may be varied.

2. A centrifugal blower as described in claim 1 including means for balancing the centrifugal force acting on said blades.

3. A centrifugal blower as described in claim 1 including a pressure regulating device whereby the relative position of said blades in said impeller may be adjusted to maintain constant at a predetermined value the pressure of the fluid delivered by said blower.

4. In combination, a centrifugal blower including a rotatable impeller, flexible elements slidably mounted in said impeller and having outwardly projecting ends adapted to slide in a substantially radial direction relatively to said impeller and inner ends adapted to be angularly displaced relatively to said impeller about the axis thereof, means for varying the angular adjustment of said inner ends relative to said impeller whereby the effective outer diameter of said impeller may be changed, and pressure responsive means operatively connected with said first mentioned means whereby the pressure of delivery of said blower may be maintained substantially constant independently of changes of the intake pressure and of the rotational speed of said blower.

5. In combination, a centrifugal blower including a rotatable impeller, flexible elements slidably mounted in said impeller and having outwardly projecting ends adapted to slide in a substantially radial direction relatively to said impeller and inner ends adapted to be angularly displaced relatively to said impeller about the axis thereof, means for varying the angular adjustment of said inner ends relative to said impeller whereby the effective outer diameter of said impeller may be changed, pressure responsive means, and a servo-motor controlled by said pressure responsive means and operatively connected with said first mentioned means whereby the absolute pressure of delivery of said blower may be maintained substantially constant independently of changes of the intake pressure.

6. In combination, a centrifugal blower including a rotatable impeller, flexible elements slidably mounted in said impeller and having outwardly projecting ends adapted to slide in a substantially radial direction relatively to said impeller and inner ends adapted to be angularly displaced relatively to said impeller about the axis thereof, means for varying the angular adjustment of said inner ends relative to said impeller whereby the effective outer diameter of said impeller may be changed, pressure responsive means, and control means, said first, second and third mentioned means being operatively interconnected whereby the pressure of delivery of said blower depends on the adjustment of said control means and is substantially independent of the intake pressure within the designed limits.

7. A centrifugal blower including an impeller chamber, a rotatable impeller therein, flexible elements slidably mounted in said impeller and angularly spaced about the axis thereof, said elements having outwardly projecting ends adapted to slide in a substantially radial direction relatively to said impeller and inner ends adapted to be angularly displaced about said axis relatively to said impeller, and means for simultaneously varying the angular adjustment of said inner ends relative to said impeller while the latter is rotating whereby said elements may be caused to slide in said impeller and the effective outer diameter of said impeller may be varied.

8. A centrifugal blower including an impeller chamber, a rotatable impeller therein, flexible adjustable elements slidably guided in said impeller, said elements having outwardly projecting unsupported portions adapted to slide in a substantially radial direction relatively to said impeller and inner ends adapted to be angularly displaced relatively to said impeller about the axis thereof, and means for varying the angular position of said inner ends relative to said impeller whereby the adjustment of said elements in said impeller may be changed, the outer parts of said elements being laterally curved on a length that varies upon changes in said adjustment of said elements to secure stiffness.

9. A centrifugal blower including an impeller chamber, a rotatable impeller therein having at least one axial inlet opening and lateral walls extending radially beyond said opening, flexible elements slidably mounted in said impeller and having outwardly projecting ends adapted to slide between said walls and determining passages extending substantially radially from said inlet opening, said elements having inner ends adapted to be angularly displaced relatively to said impeller about the axis thereof, and means for simultaneously varying the angular adjustment of said inner ends relative to said impeller whereby said elements may be caused to slide and thereby the radial length of said passages may be varied.

FERDINANDO CARLO REGGIO.